United States Patent [19]

Licke

[11] 4,052,420

[45] * Oct. 4, 1977

[54] PROCESS FOR PRODUCING DIURETHANE FROM DINITRO COMPOUNDS, HYDROXYL COMPOUNDS AND CARBON MONOXIDE

[75] Inventor: George C. Licke, Oxford, Mich.

[73] Assignee: Ethyl Corporation, Richmond, Va.

[*] Notice: The portion of the term of this patent subsequent to Oct. 4, 1994, has been disclaimed.

[21] Appl. No.: 615,762

[22] Filed: Sept. 22, 1975

[51] Int. Cl.$^2$ .......................................... C07C 125/06
[52] U.S. Cl. .................. 260/351; 260/468 E; 260/470; 260/471 C; 260/479 C; 260/481 C; 260/482 B; 260/482 C; 560/25; 560/22; 560/9; 560/13; 560/115; 560/158; 560/114; 560/133; 560/134
[58] Field of Search ........... 260/471 C, 482 C, 482 B, 260/468 E, 479 C, 470, 481 C, 351

[56] References Cited

U.S. PATENT DOCUMENTS

| | | | |
|---|---|---|---|
| 3,467,694 | 9/1969 | Hardy et al. | 260/471 C |
| 3,576,836 | 4/1971 | Prichard | 260/453 |
| 3,728,370 | 4/1973 | Ottmann et al. | 260/453 |
| 3,754,014 | 8/1973 | Kober et al. | 260/453 |

FOREIGN PATENT DOCUMENTS 1,025,436  4/1966  United Kingdom .......... 260/453 PC

*Primary Examiner*—Jane S. Myers
*Attorney, Agent, or Firm*—Donald L. Johnson; Robert A. Linn; Willard G. Montgomery

[57] ABSTRACT

In the process for preparing a diurethane, particularly an aromatic diurethane, by the reaction of an organic dinitro compound, particularly an aromatic dinitro compound, carbon monoxide, and an organic hydroxyl compound in the presence of a catalyst, the improvement which comprises employing as said catalyst rhodium oxide, particularly substantially amorphous rhodium oxide, and carrying out the reaction in two stages, the first stage being carried out at a first temperature and pressure and the second stage being carried out at a higher temperature and pressure, and optionally conducting the reaction in a nitrilic solvent.

10 Claims, No Drawings

4,052,420

PROCESS FOR PRODUCING DIURETHANE FROM DINITRO COMPOUNDS, HYDROXYL COMPOUNDS AND CARBON MONOXIDE

BACKGROUND OF THE INVENTION

It is known in the art to manufacture urethanes by reacting hydroxyl group-containing organic compounds, such as alcohols or phenols, with carbon monoxide and certain nitrogenous compounds, using metal carbonyls, certain metal complexes, and certain metallic compounds, as catalysts. Thus, British Pat. No. 1,080,094, to Ibbotson, teaches the above-described process using as a catalyst a mixture of two or more metal halides, at least one of the said metal halides being a halide of a transition metal; British Pat. No. 1,092,157, to Gamlen et al., teaches using as a catalyst a metal complex compound containing at least one transition metal and at least one unsaturated hydrocarbon ligand in which the unsaturated system forms a bond with the metal; British Pat. No. 1,087,896, to Ibbotson, teaches using as a catalyst a mixture of one or more metals capable of existence in two or more valency states and one or more halides of metals other than the metal or metals first mentioned and also capable of existence in two or more valency states; U.S. Pat. No. 3,338,956, to Mountfield, teaches using as catalyst, metal carbonyls. Applicant has discovered that the above reaction can produce very high yields of diurethane with relatively little undesirable side products if it is carried out in two stages, the first stage utilizing one temperature and pressure, and the second stage being carried out at a higher temperature and pressure.

SUMMARY OF THE INVENTION

Conversion of organic dinitro compounds to diurethanes is obtained by reacting a dinitro compound with carbon monoxide and a hydroxyl containing compound in the presence of amorphous rhodium oxide catalyst in two stages. The first stage, or step, being carried out at one temperature and pressure and the second stage being carried out at a second, and higher, temperature and pressure. Optionally, the reaction is carried out in the presence of a nitrile compound.

DESCRIPTION OF THE PREFERRED EMBODIMENTS

The present invention is embodied in a method for producing diurethanes, particularly aromatic diurethanes, from organic dinitro, particularly aromatic dinitro, compounds. In the process of the present invention an organic dinitro compound is reacted with carbon monoxide and an organic compound containing at least one hydroxyl group in the presence of a substantially amorphous rhodium oxide catalyst in two stages or steps, to produce a diurethane. Optionally, the reaction is conducted in the presence of an organic nitrile compound. The diurethane can then be transformed, as by thermal decomposition, to a diisocyanate.

The organic dinitro compounds for use in the process of the present invention can be aliphatic or aromatic dinitro compounds. The aliphatic and aromatic dinitro compounds can be substituted or unsubstituted. When substituted, they can be substituted with one or more substituents such as nitroalkyl, alkyl, alkenyl, alkoxy, aryloxy, halogen, alkylthio, arylthio, carboxylalkyl, and the like. Preferred dinitro compounds contain up to about 20 carbon atoms; more preferred dinitro compounds contain up to 16 carbon atoms. Most preferred dinitro compounds contain up to 10 carbon atoms. Some general examples of suitable aromatic dinitro compounds are dinitrobenzene, alkyl and alkoxy dinitrobenzenes wherein the alkyl group contains up to 10 carbon atoms, aryl and aryloxy dinitrobenzenes wherein the aryl group is phenyl, tolyl, xylyl, naphthyl, chlorophenyl, chlorotolyl, chloroxylyl or chloronaphthyl, and chlorodinitrobenzenes as well as similarly substituted dinitro derivatives of the naphthalene, diphenyl, diphenylmethane, anthracene and phenanthrene series. Some specific examples of suitable substituted aromatic dinitro compounds are: m-dinitrobenzene, p-dinitrobenzene, 2,4-dinitrotoluene, 2,6-dinitrotoluene, dinitromesitylene, 4,4'-dinitrobiphenyl, 2,4-dinitrobiphenyl, 4,4'-dinitrobibenzyl, bis(2,4-dinitrophenyl)ether, α, α'-dinitro-p-xylene, 1-chloro-2,4-dinitrobenzene, 1,3,5-trichloro-2,4-dinitrobenzene, 1-bromo-2,4-dinitrobenzene, 1-fluoro-2,4-dinitrobenzene, 2,4-dinitrophenetole, 2,4-dinitroanisole, 3,5-dinitrobenzoylchloride, and 2,4-dinitrobenzenesulfonylchloride. Some typical examples of substituted or unsubstituted aliphatic dinitro compounds are dinitroethane, dinitropropane, dinitrobutane, dinitrohexane, dinitrodecane, dinitrocyclohexane, dinitromethylcyclohexane, and dinitrocyclohexylmethane. The most preferred dinitro aromatic compounds are the dinitrobenzenes and dinitrotoluenes, particularly 2,4- and 2,6-dinitrotoluene.

The organic compound containing at least one hydroxyl group is preferably an alcohol or a phenol. The alcohol may be a mono- or polyhydric alcohol containing primary, secondary, or tertiary hydroxyl groups. The phenol can be a monohydric or polyhydric phenol. The alcohols may be either aliphatic or aromatic. Substituent groups may be present with the proviso that the substituent groups do not unduly hinder, impede, or interfere with the reaction of carbon monoxide, nitro compound and alcohol. Some examples of monohydric alcohols are methyl alcohol, ethyl alcohol, n-, and isopropyl alcohol, benzyl alcohol, chlorobenzyl alcohol, and methoxybenzyl alcohol. Some examples of mono- and polyhydric phenols are phenol, chlorophenol, methyl, ethyl, butyl and higher alkyl phenols, catechol, resorcinol, quinol, 4,4'-dihydroxydiphenylmethane, chloronaphthols, methyl, ethyl, butyl and octyl naphthols, anthranols, chloroanthranols, methyl, ethyl, butyl and anthranols, phenanthrols, chlorophenanthrols and methyl, ethyl, butyl and octyl phenanthrols. Preferred alcohols and phenols are those that contain up to 2 carbon atoms; more preferred are alcohols and phenols containing up to 16 carbon atoms, most preferred alcohols and phenols contain up to 1 carbon atoms. The preferred hydroxyl containing organic compounds are alcohols. The preferred alcohols are the aliphatic alcohols. The preferred aliphatic alcohols are the lower alkanols such as t-butanol, methanol, ethanol, propanol, butanol and the like. The most preferred alkanols are methanol and ethanol. It has been found that generally as the number of carbons bearing abstractable hydrogens in the alcohols or phenol increases, the amount of undesirable side products, particularly amines, increases. Thus, for this reason, it is preferred to use the lower alcohols and phenols.

Although the preferred compounds containing at least one hydroxyl group are the aforedescribed aliphatic and aromatic alcohols and phenols or mixtures of alcohols and/or phenols, diols such as ethylene glycol, diethylene glycol, propylene glycol and dipropylene glycol, triols such as glycerol, trimethylol propane, hexanetriol, and tetrols such as pentaerythritol, ethers may also be used.

The solvents which are optionally employed in the process of this invention are the organic cyano compounds. These compounds may be aliphatic or aromatic cyano compounds. Preferred cyano compounds are those containing up to about 20 carbon atoms. More preferred cyano compounds are those contaning up to about 16 carbon atoms. Most preferred cyano compounds are those containing up to 10 carbon atoms. Some examples of the nitrilic solvents are acetonitrile, propionitrile, n-butyronitrile, isobutyronitrile, n-valeronitrile, benzonitrile, toluenitrile, and the like. Some examples of dinitriles are succinitrile, glutaronitrile, adiponitrile and the like. Mixtures of organic cyanides can be used in the present process. The preferred cyanides are the alkyl cyanides with the more preferred cyanides being the lower alkyl cyanides. The most preferred cyanide is acetonitrile.

The rhodium oxide catalyst employed can be $RhO_2$ or $Rh_2O_3$. The rhodium oxide catalyst should be amorphous rhodium oxide. By amorphous rhodium oxide is meant rhodium oxide which is substantially amorphous, that is, the greater part, by weight, of which is in an amorphous state. Small quantities of crystalline rhodium oxide may be present, as long as the proportion of crystalline rhodium oxide to amorphous rhodium oxide is not great enough so as to deleteriously affect the properties of the amorphous rhodium oxide as a catalyst.

Generally, the amorphous rhodium oxide which can be used is commercially available amorphous rhodium oxide, such as that produced by Pfaltz and Bauer, Inc., of Flushing, New York. It is not necessary to vigorously exclude crystalline rhodium oxide from the rhodium oxide insomuch as the amount of crystalline rhodium oxide present in the rhodium oxide is not detrimental to the improved process. Generally, the amount of crystalline rhodium oxide present should be less than 50% by weight, preferably less than 25% by weight, more preferably less than 10% by weight, and most preferably less than 1% by weight. That is to say, more preferably the rhodium oxide should be about 99% amorphous rhodium oxide.

The two oxides of rhodium which are used as catalysts are rhodium dioxide, $RhO_2$, and rhodium sesquioxide, $Rh_2O_3$, both of which are amorphous or substantially amorphous.

The discovery has been made that diurethanes can be prepared in high yields by a two stage, i.e., two different temperatures and pressures, reaction of an organic dinitro compound with carbon monoxide and an alcohol or phenol in the presence of a generally amorphous rhodium oxide catalyst. In a preferred embodiment of the invention the reaction is additionally carried out in a nitrilic solvent. The reaction is conducted under CO pressure. The CO pressures used may be subatmospheric pressures, atmospheric pressures or superatmospheric pressures. Superatmospheric pressures are preferred as at pressures above ambient, the reaction rate is generally increased. There is no real upper limit on the CO pressures that can be used and the upper limit is, therefore, determined by such secondary considerations as cost, equipment design, and the like. While, generally, the pressures cam range from atmospheric pressure, provided enough CO can be present at atmospheric pressure to react with the nitro compound, to the aforementioned upper limit, a preferred range of pressures is from about 600 p.s.i. to about 10,000 p.s.i. A more preferred range of pressures is from about 1,000 p.s.i. to about 8,000 p.s.i., while a most preferred range of pressures is from about 1,500 p.s.i. to about 5,000 p.s.i. Generally the amount of CO required is an amount sufficient to coreact with the hydroxyl containing organic compond and dinitro compound to form urethane. For complete theoretical conversion of the dinitro compound to the urethane at least 3 CO groups are required for every $NO_2$ group in the dinitro compound. therefore, generally 3 or more CO groups for every $NO_2$ group in the dinitro compound are preferred. The reaction can proceed with less than 3 moles of CO for every $NO_2$ group per mole of dinitro compound; however the amount of co-products wll generally increase with the decrease of CO concentration below this preferred level. Generally the amount of alcohol or phenol required is an amount sufficient to react with the CO and di-nitro compound to produce urethane. For complete theoretical conversion of the dinitro compound to diurethane at least one mole of alcohol or phenol is required for every $NO_2$ group present per mole of dinitro compound. Thus, in a preferred embodiment of the invention the concentration of alcohol or phenol is such as to provide at least one mole or an excess thereof, of alcohol or phenol for every $NO_2$ group present in the dinitro compound. The reaction can proceed with less than a theoretical amount of alcohol or phenol; however, this leads to a mixture of isocyanates, isocyanate-urethanes, and urethanes as the product. The amount of co-products, such as cyclic or heterocyclic nitrogen compounds, may also increase.

In a preferred embodiment of the present invention the rhodium oxides, which are generally substantialy amorphous rhodium dioxide and substantially amorphous rhodium sesquioxide, serve as a catalyst and increase the yields of the diurethanes. The amount of rhodium oxide used is a catalytic amount. By catalytic amount is meant an amount sufficient to catalyze the conversion of the nitro compound to urethane. Generally, the amount of catalyst should be sufficient to provide about 0.5 gram of rhodium dioxide or sesquioxide per 0.1 mole of dinitro compound. At or above these concentrations, using rhodium sesquioxide or dioxide, a nitrilic compound, and a dinitro compound, large yields or diurethanes are obtained. Generally, as the concentration of catalyst decreases, the yields of diurethanes begins to decrease and the yields of monourethanes begins to increase.

The reaction is carried out at temperatures ranging from about ambient to about 400° C. Generally the upper range of the temperature should be below that at which polymerization or decomposition of the reaction components occurs to an undesirable extent. Preferred temperatures are from about 100° to about 225° C. The more preferred temperatures are from about 125° to about 200° C. The reaction times will vary, depending to some extent on the temperatures and pressures at which the reaction is carried out. In general, the higher the temperatures and/or pressures, the faster the reaction, and conversely, the lower the tempertures and/or pressures, the slower the reaction rate. Generally the reaction times range from about thirty minutes to about 12 hours.

In a more preferred embodiment of the present invention the solvent system is one which preferably contains at least a small amount of a nitrilic compound. Thus, the solvent can be composed entirely of a nitrilic compound, a mixture of nitrilic compounds, or a mixture of a nitrilic compound and a non-nitrilic inert organic solvent. Examples of inert organic solvents are the aliphatic or aromatic hydrocarbons such as n-pentane, benzene, toluene, xylene, halogenated aliphatic hydrocarbons such as 1,1,2-trichloro-1, 2,2-trifluoroethane, halogenated aromatic hydrocarbons such as monochlorobenzene, dichlorobenzene, trichlorobenzene, and the like.

The amount of solvent used is a solvating amount, i.e., an amount to sufficiently contact the reactants to enable them to coreact to form the urethane. The organic nitrile compound can be used as a solvent-promoter or as a promoter. It has been found that the nitrile compound, when present in even small amounts, has yield enhancing, conversion enhancing, and rate enhancing effects upon the reaction. By yield enhancing effects is meant that the yield of diurethane is increased over that obtained where there is no nitrile compound present. By conversion enhancing effect is meant that the conversion of the dinitro compound is increased over that obtained without the nitrile compound. By rate enhancing effect is meant that the rate of the reaction is increased over that of a system without the nitrile compound. In a most preferred embodiment the solvent system used is one comprised of a nitrile compound or a mixture of nitrile compounds. In this embodiment the nitrile compound acts as both a solvent and a yield, rate, and conversion enhancer or promoter. In another embodiment a yield enhancing amount or promoter amount of the nitrile compound can be added to a solvent system comprised of one of the inert organic solvents described above. In this embodiment as little as 1%, by volume, of nitrile compound can be effective to enhance the rates, yields, and conversions of the reaction. Generally, in this embodiment, the amount of nitrile present, in volume percent, is from about 1% to about 99%, preferably from about 2% to about 50%, and more preferably from about 3% to about 30%. By yield enhancing amount is meant that amount of organic nitrile compound sufficient to increase the yield of the reaction over that of a reaction without an organic nitrile compound.

Generally, the first stage is carried out at temperatures in the range of from about 100° C. to about 160° C., preferably from about 110° C. to about 150° C., more preferably from about 115° C, to about 135° C., most preferably from about 120° to about 130° C. The pressures at which the first stage is carried out generally fall in the range of from about 1,000 p.s.i. to about 4,000 p.s.i., preferably from about 1,200 p.s.i. to about 3,000 p.s.i., more preferably from about 1,300 p.s.i. to about 2,000 p.s.i., most preferably from about 1,400 p.s.i. to about 1,800 p.s.i. The second stage is generally carried out at temperatures of from about 150° to about 225° C., preferably from about 160° to about 200° C., more preferably from about 165° to about 195° C., and most preferably from about 170° to about 190° C. The pressures utilized in the second stage are generally from about 3,000 p.s.i., to about 10,000 p.s.i., preferably from about 3,000 p.s.i. to about 6,000 p.s.i.

During the first stage at the relatively low temperatures and pressures, it is believed that carbonylation, i.e., urethane formation, is enhanced and predominates over reduction, i.e., amine formation. Thus, generally during the first stage the formation of a monourethane predominates. During the second stage, when higher temperatures and pressures are utilized, the energy barrier of the remaining nitro group of the polynitro, particularly the dinitro, compound toward carbonylation is lowered due to the presence of the urethane group formed during the first stage. Thus, generally, cabonylation reactions predominate over reduction, i.e., amine formation, reactions in the second stage thereby resulting in the formation of a diurethane.

The temperatures and pressures of the first stage should be high enough, i.e., sufficient, to allow carbonylation of the dinitro compound but not high enough to allow, to any untoward extent, the competing reduction reactions, i.e., amine formation. The temperatures and pressures of the second stage are higher than the temperatures and pressures of the first stage. The temperatures and pressures of the second stage should be high enough, i.e., sufficient, to promote the carbonylation, i.e., urethane formation, of the remaining nitro group but insufficient to allow, to any untoward degree, the competing reduction reactions, i.e., amine formation.

The time periods of the two stages can vary widely depending upon the reaction conditions. Generally, the first stage is carried out until a substantial amount of the dinitro compound is converted to the monourethane. The second stage is generally carried out until a substantial amount of diurethane is formed. Generally, the reaction times, under the afore-described temperatures and pressure conditions, can range from about 30 minutes to about 1 hours.

This invention is illustrated in the following examples.

EXAMPLE I

A suitable pressure vessel was charged with 160 ml of acetonitrile, 4.6 grams of ethanol, 18.2 grams of 2,4-dinitrotoluene, and 0.50 gram of substantially amorphous rhodium sesquioxide. The pressure vessel was sealed and purged with nitrogen followed by a carbon monoxide purge. Carbon monoxide was introduced until a pressure of 3,000 p.s.i. was obtained. The pressure vessel was heated to 125° C. After maintaining the temperature at 125° C. for 5 hours 4.00 grams of methanol were added and the temperature was increased to 175° C. and the pressure was 4,775 p.s.i. at 175° C. After maintaining the temperature at 175° C. for 5 hours the vessel was cooled to room temperature. The pressure vessel was vented and flushed with nitrogen. The reaction mixture was discharged via a dip-leg with nitrogen pressure. The reaction mixture was analyzed by Vapor Phase Chromatography. Analysis by Vapor Phase Chromatography indicated a 99.68% yield of diurethanes, predominantly a mixture of 1-ethyl, 3-methyl(4-methyl-1,3-phenylene)biscarbamate and 3-ethyl,1-methyl(4-methyl-1,3-phenylene)biscarbamate with some diethyl (4-methyl-1,3-phenylene) biscarbamate and dimethyl(4-methyl-1,3-phenylene)biscarbamate.

EXAMPLE II

A suitable pressure vessel was charged with 160 ml of acetonitrile, 9.2 grams of ethanol, 18.2 grams of 2,4-dinitrotoluene, and 0.50 gram of substantially amorphous rhodium sesquioxide catalyst. The pressure vessel was sealed and purged with nitrogen followed by a carbon monoxide purge. Carbon monoxide was introduced until a pressure of 1,600 p.s.i. was obtained. The pressure vessel was heated to 125° C. After maintaining the temperature at 125° C. for 5 hours the pressure was then increased, by addition of CO, to 4,300 p.s.i. at 125° C. The temperature was increased to 175° C. The pressure ws 4,825 p.s.i. at 175° C. After maintaining the temperature at 175° C. for 5 hours the pressure vessel was cooled to room temperature. The pressure vessel was vented and flushed with nitrogen. The reaction mixture was discharged via a dip-leg with nitrogen pressure. The reaction mixture was analyzed by Vapor Phase chromatography. Analysis by Vapor Phase Chromatography indicated a 63.96% yield of diurethanes, predominantly diethyl (4-methyl-1,3-phenylene)biscarbamate, 7.57% of 2,4-diaminotoluene, and 28.46% unknowns.

EXAMPLE III

The general procedure of Example II was repeated substituting 1.00 gram of rhodium bromide ($RhBr_3$) catalyst for the rhodium sesquioxide catalyst. Analysis of the reaction mixture by Vapor Phase Chromatography indicated substantially no diurethanes, 77.36% of 2,4-dinitrotoluene remaining, 8.92% of diaminotoluene, and 9.55% of 5-nitro-o-toluidine.

EXAMPLE IV

The general procedure of Example II was repeated substituting 0.42 gram of palladium chloride ($PdCl_2$) catalyst for the rhodium sesquioxide catalyst. Analysis of the reaction mixture by Vapor Phase Chromatography indicated substantially no diurethanes, 37.94% of monourethane, mostly a mixture of ethyl(4-methyl-3-nitrophenyl)carbamate and ethyl(2-methyl-5-nitrophenyl)carbamate, 51.5% of 2,4-dinitrotoluene remaining, 3.9% of 3-nitro-p-toluidine, and 5.79% of 5-nitro-o-toluidine.

EXAMPLE V

The general procedure of Example II was repeated substituting 0.50 gram of rhodium carbonyl ($Rh_6(CO)_{16}$) catalyst for the rhodium sesquioxide catalyst. Analysis of the reaction mixture by Vapor Phase Chromatography indicated a 23.25% yield of diurethanes predominantly diethyl(4-methyl-1,3-phenylene)biscarbamate, 42.13% of monourethanes, predominantly a mixture of ethyl(4-methyl-3-nitrophenyl)carbamate and ethyl-(2-methyl-5-nitrophenyl)carbamate, 26.41% of 2,4-diaminotoluene, 5.73% of 3-nitro-p-toluidine, and 2.48% of 5-nitro-o-toluidine.

As can be seen from the foregoing examples conversion of dinitro compounds to the diurethanes is most effective when the reaction is carried using amorphous rhodium oxide catalyst. However, using an amorphous rhodium oxide catalyst and a solvent other than a nitrilic solvent, such as benzene, also effects conversion of the dinitro compounds to diurethanes, although the yield per period of time is less than if the reaction was conducted in the presence of an organic nitrile.

Thus, one embodiment of the present invention is in a process for preparing diurethanes by reacting an organic dinitro compound with carbon monoxide, an alcohol or phenol at an elevated temperature and an elevated pressure in the presence of a catalyst, the improvement which comprises utilizing substantially amorphous rhodium oxide catalyst and carrying out the reaction in two stages. The first stage comprising reacting the dinitro compound with carbon monoxide and an alcohol or phenol at a first elevated temperature and pressure, said first elevated temperature and pressure being high enough, or sufficient, for substantial carbonylation of at least one of the nitro groups of said dinitro compound but not high enough, or insufficient, for any untoward reduction, i.e., amine formation, of the nitro groups of said dinitro compound, and the second stage comprising conducting the reaction at a second elevated temperatures and pressure, said second elevated temperature and pressure being higher than said first elevated temperature and pressure and being sufficient to substantially carbonylate remaining nitro groups of said dinitro compound, whereby the yield of diurethane is increased over that obtained by carrying out the reaction of substantially one temperature and pressure. Optionally, the reaction, both stages 1 and 2, can be carried out in the presence of an organic nitrile.

Because the carbonylation and reduction reactions are generally competitive in the process of the present invention it is important that during the first stage the temperatures and pressures be kept below the point at which reduction takes place. Although it is generally difficult to obtain complete carbonylation, i.e., only carbonylation reactions, without any reduction or amine formation taking place, nevertheless the temperatures and pressures should be such that the carbonylation reaction substantially predominates and any untoward reduction reactions do not occur, i.e., that there is no significant reduction or amine formation. In other words, that the carbonylation reactions be as high as possible and the reduction reactions be as low as possible.

The process of the present invention is particularly effective in producing aromatic diurethanes from aromatic dinitro compounds. Generally, high yields of these diurethanes can be obtained by the use of substantially amorphous rhodium oxide catalysts, The yields of diurethanes are further enchanced by carrying out the reaction in the presence of the aforementioned organic nitrile compound.

Thus, a preferred embodiment of the present invention is in a process for preparing an aromatic diurethane which comprises reacting, in the presence of a substantially amorphous rhodium oxide catalyst, an aromatic dinitro compound with carbon monoxide and an alkanol (1) at a first elevated temperature and a first elevated pressure and (2) thereafter continuing the reactIon at a second elevated temperature and a second elevated pressure, said second temperature and pressure being higher than said first temperature and pressure, the reaction being carried out in the presence of an organic nitrile compound. The amount of said organic nitrile compound being a yield enhancing amount.

In a most preferred embodiment the dinitro compound is dinitrotoluene, the alkanol is methanol or ethanol, the nitrile compound is acetonitrile and is used, and functions, as both a solvent and yield enhancer or promoter, the first elevated temperatures are from about 110° to about 150° C., and the first elevated pressures are from about 1,500 p.s.i. to about 3,000 p.s.i., the second temperatures are from about 160° to about 200° C., and the second elevated pressures are from about 3,000 p.s.i. to about 6,000 p.s.i.

The elevated temperatures and pressures should be such that the organic dinitro compound, aliphatic or aromatic alcohols or phenols, and carbon monoxide coreact in the presence of the rhodium oxide catalyst to form diurethanes.

In the process of the present invention the alcohol or phenol used to react with the dinitro compound and carbon monoxide can be the same in both stages, as for example in the procedure of Example II. Alternately, one alcohol or phenol can be used in the first stage and a second, different, alcohol or phenol can be used in the second stage, as for example in the procedure of Example I.

It has been found that when two different alcohols or phenols are used it is generally preferably to use the higher alcohol or phenol in the first stage and the lower alcohol or phenol in the second stage. For reasons not clearly understood, the presence of a higher monourethane group obtained from the higher alcohol or phenol in the first stage has an activating effect towards the carbonylation reaction, i.e., urethane formation, in the second stage wherein the second nitro group is carbonylated to form a lower urethane group by reaction with the second lower alcohol or phenol. This generally results in substantially complete conversion of the monourethane to the diurethane. Such complete conversion is generally not encountered if the lower alcohol or phenol is used in the first stage to form the lower monourethane.

Thus, another embodiment of the present invention is an improvement in a process for preparing a diurethane by the reaction, at elevated temperature and pressure, of an organic dinitro compound, carbon monoxide, and an alcohol or phenol in the presence of a catalyst, said improvement comprising using substantially amorphous rhodium oxide as the catalyst, and conducting the reaction in two stages, (1) the first stage comprising reacting said dinitro compound, carbon monoxide, and a first alcohol or phenol at a first elevated temperature and pressure, said first elevated temperture and pressure being sufficient for substantial carbonylation of at least one of the dinitro groups of said dinitro compound but insufficient for any significant or untoward reduction of the nitro groups of said dinitro compound, and (2) the second stage comprising reacting said dinitro compound, carbon monoxide, and a second alcohol or phenol, said second alcohol or phenol being different from said first alcohol or phenol, at a second elevated temperature and pressure, said second elevated temperature and pressure being higher than said first elevated temperture and pressure and being sufficient to substantially carbonylate remaining nitro groups of said dinitro compound, whereby the yield of diurethane is increased over that obtained by carrying out the reaction at substantially one temperature and pressure.

While in the preferred embodiment of the present invention a dinitro compound is coreacted with carbon monoxide and a hydroxyl containing compound such as an alcohol or phenol in the presence of a rhodium oxide catalyst, other organic compounds containing at least one nitrogen atom bonded directly to a single carbon atom and to an oxygen or another nitrogen atom may be used in place of the nitro compound to produce urethanes. Examples of these types of compounds which may be substituted for the nitro compound are the organic nitroso, azo and azoxy compounds.

In all of the examples set forth above yield figures based on analysis by Vapor Phase Chromatography are in area percent. Also in all of these examples substantially anhydrous conditions were observed.

Claims to the invention follow.

I claim:

1. In a process for preparing a diurethane by the reaction at elevated temperature and pressure of an organic dinitro compound, carbon monoxide, and an alcohol or phenol in the presence of a catalyst, the improvement which comprises conducting said reaction in the presence of a promoter amount of an alkyl nitrile compound using substantially amorphous rhodium oxide as the catalyst, and conducting the reaction in two stages, (1) the first stage comprising conducting the reaction at a first elevated temperature and pressure, said first elevated temperature and pressure being high enough for substantial carbonylation of at least one of the nitro groups of said dinitro compound but not high enough for any untoward reduction of the nitro groups of said dinitro compound, and (2) the second stage comprising conducting the reaction at a second elevated temperature and pressure, said second elevated temperature and pressure being higher than said first elevated temperature and pressure and being sufficient to substantially carbonylate remaining nitro groups of said dinitro compound, whereby the yield of diurethane is increased over that obtained by carrying out the reaction at substantially one temperature and pressure.

2. A process according to claim 1 wherein said organic dinitro compound is an aromatic dinitro compound.

3. A process according to claim 2 wherein said aromatic dinitro compound is dinitrotoluene.

4. A process according to claim 1 wherein said first temperature is from about 110° to about 150° C.

5. A process according to claim 4 wherein said first pressure is from about 1,500 p.s.i. to about 3,000 p.s.i.

6. A process according to claim 1 wherein said second temperature is from about 160° to about 200° C.

7. A process according to claim 6 wherein said second pressure is from about 3,000 p.s.i. to about 6,000 p.s.i.

8. A process according to claim 1 wherein stage 1 is carried out until one nitro group of said dinitro compound has been substantially carbonylated.

9. A process according to claim 1 wherein said alkyl nitrile compound is acetonitrile.

10. In a process for preparing a diurethane by the reaction, at elevated temperature and pressure, of an organic dinitro compound, carbon monoxide, and an alcohol or phenol in the presence of a catalyst, said improvement comprising conducting said reaction in the presence of a promoter amount of an alkyl nitrile compound using substantially amorphous rhodium oxide as the catalyst, and conducting the reaction in two stages, (1) the first stage comprising reacting said dinitro compound, carbon monoxide, and a first alcohol or phenol at a first elevated temperature and pressure, said first elevated temperature and pressure being sufficient for substantial carbonylation of at least one of the nitro groups of said dinitro compound but insufficient for any significant reduction of the nitro group of said dinitro compound, and (2) the second stage comprising reacting said dinitro compound, carbon monoxide, and a second alcohol or phenol, said second alcohol or phenol being different from said first alcohol or phenol, at a second elevated temperature and pressure, said second elevated temperature and pressure being higher than said first elevated temperature and pressure and being sufficient to substantially carbonylate remaining nitro groups of said dinitro compound.

* * * * *